Patented Feb. 6, 1923.

1,444,562

UNITED STATES PATENT OFFICE.

JOHN C. SHERMAN, OF PORTLAND, MAINE, ASSIGNOR TO BROWN COMPANY, OF PORTLAND, MAINE, A CORPORATION OF MAINE.

BUTTER SUBSTITUTE.

No Drawing. Application filed August 22, 1919. Serial No. 319,123.

*To all whom it may concern:*

Be it known that I, JOHN C. SHERMAN, a citizen of the United States, residing at Portland, in the county of Cumberland and State of Maine, have invented new and useful Improvements in Butter Substitutes, of which the following is a specification.

The object of the present invention is to furnish a butter substitute or margarine having a flavor approximating that of creamery butter and having also the quality of maintaining its desirable flavor for at least the length of time required for its marketing and consumption. Butter substitutes are commonly made of oils with which is mixed a sufficient proportion of skim milk to reduce the proportional content of fat and to simulate the composition of butter, the mixture of oil and milk being churned with or without admixture of salt. The oils used for this purpose include those which are solid or semi-solid at ordinary temperature in the natural condition, as cocoanut oil, and those which have been rendered solid or semi-solid by partial hydrogenation such as peanut oil, cotton seed oil, and others, and combinations of hydrogenized and natural semi-solid oils. It is a fact that margarines made with skim milk quickly become strong tasting, that is, they lose their desirable flavor and acquire an objectionable flavor, making them unfit for human food, due to the decomposition of the fluid milk. In other words, stated in common parlance, these margarines do not keep "sweet" for any great length of time; they have poor "keeping" qualities.

I have discovered that it is the water content of skim milk which causes the deterioration thus indicated, and that if water is omitted from the product there results a margarine which has very nearly the same flavor as butter and has the quality of "keeping sweet" or maintaining the flavor without deterioration for an indefinite length of time, and certainly for a much longer time than is ordinarily needed in marketing the product and until it is used by the consumer.

I have made a butter substitute or waterless margarine by mixing together from 90% to 95% of hard oil, approximately 2% of dry salt, and the balance (8% to 3%) of dry powdered skim milk, or dry powdered whole milk, or dry powdered buttermilk, or dry powdered cream, or a mixture of two or more of these dry milk products. Thus I have produced a waterless margarine consisting essentially of a hard oil and a dry powdered milk product in the proportions necessary to give the product the flavor desired by consumers and to avoid the objectionable fatty taste which is a characteristic of unmodified oil. It is, of course, necessary to use only oils or fats which in the finished product are substantially without any water content.

Although I have here stated certain specific proportions it is to be understood that they are thus stated simply for illustration and without intent to prescribe exact limits, and that the proportions may be largely varied without departing from the essential characteristic of the invention, which is a butter substitute free from water. It should be understood that the fatty and non-fatty elements of my product approximate in a general way the composition of butter in their proportions; although, because water is omitted from my product while it is present in butter in relatively large amounts, the proportions of these constitutents in my product may depart more or less widely from the proportions in butter. It is stated by recognized authorities that the water content of butter is approximately 12% of the total weight. With this water or moisture are associated in butter the organic solids existing in the lacteal fluids. The non-fatty elements of milk which are found in butter, considered in their dry state are therefore present in the amount in which they naturally occur in the above mentioned amount of fluid. Undoubtedly a greater moisture content has occurred in many butters due to the addition of water as an adulterating element, but for the purposes of this specification no account need be taken of such adulterating element.

With a normal moisture content of 12%, butter will ordinarily contain approximately 1.3% of curd and 2% of salt and ash, reckoned by the established methods of analysis. In the preferred form of my product there may be as much as 3% by weight of dry milk solids, 2% of salt and 95% of fat. Thus the dry milk solid content of my product may be substantially more than that of the average butter. I find it desirable to add more, rather than less, of a dry milk product to my butter substitute than the normal dry milk solid content of butter, in order to reduce the proportion of fat content to a point more nearly approximating the proportional fat content of butter, and thus compensate to some extent for the omission of moisture, the presence of which in butter serves to prevent the fat content thereof from reaching an unduly high percentage. I may, without departing from the purpose of my invention, or from the scope of the protection claimed for it, exactly imitate in my product the normal fat content of the average butter, namely about 84% by weight, and mix therewith as above described, 16% by weight of non-fatty milk solids, in which case my product corresponds to an unsalted butter; or I may use 84% of fat, 13% of milk solids, and 3% of salt, in which case my product corresponds to salted butter; both comparisons being made with respect to the fat content of my butter substitute as compared with that of butter. Of course the salt, being provided merely as flavoring may be so provided in any proportion according to taste.

For the fat content of the margarine any good oil which is or may be made of approximately the consistency of butter at ordinary temperatures may be used. Thus the oils previously named, that is, both cocoanut oil, peanut, or cotton seed oils hydrogenized to a greater or less extent, mixtures of such oils, and other oils may be used.

In compounding the said ingredients, the fat is melted and the dry powdered ingredients (milk powder or milk powder and salt) are mixed or stirred into it, and the melted fat is then allowed to cool gradually so that the dry ingredients will be prevented from separating or settling, or otherwise failing to make a homogeneous mixture. These powdered ingredients should be pulverized to extreme fineness in order to avoid a gritty sensation to the tongue; and in order to secure a smoother mixture than can be made even by extreme pulverization, I preferably pass the product while in the melted condition through a homogenizing apparatus. The gritty feeling is given by crystals of lactose, a form of sugar found in milk, which exists as a dry crystal. The structure of these crystals is to a certain extent broken down or at least softened in hot fat, wherefore the crystals pass easily through the exceedingly minute apertures or passages of the homogenizing apparatus. The non-crystalline particles of the milk powder are also softened in hot fat. Hence the effect of homogenizing the mixture to produce a very smooth mixture which is not distinguishable by the tongue from butter in respect to its smooth homogeneous consistency. This is particularly the case when salt is omitted, although even when salt is used, and if the salt crystals do not entirely break down under the homogenizing pressure, the product will be no more gritty than salted butter, in which usually some of the contained salt has become crystalline to a degree appreciable by the tongue.

I can secure substantially any degree of firmness or hardness in my product, or as high a melting point as may ever be needed, by using in the first place a fat which has previously been hardened by hydrogenation or by admixture of hard and soft fats, or is naturally hard, in the desired degree.

In this specification I have referred to an oil or a fat without distinction in terms, because in practice there are no binding distinctions between these terms. Thus for example, the so-called cocoanut oil is ordinarily of hard consistency, resembling in this respect hard butter fat; and a liquid oil may be rendered suitable for my purpose by hydrogenation or by admixture with an oil which is naturally or ordinarily hard enough to give to the mixture the necessary firmness. Similarly stearin, a very hard fat product, is available for my purpose, either when used as the sole fat ingredient or when mixed with a fat or oil of lower melting point. In the claims, however, the term "fat" is used as a generic term including all natural oils and fats and the hydrogenated product of natural or derived oils. Although I have mentioned specifically in the foregoing description only certain oils, I would have it understood that I claim protection for the composition and the method of making it including any sort of edible fat, whether animal or vegetable, and including not only the specific oils named but stearin or tallow and all other edible fats which are free or may be freed, from water.

It is well known that the hardness of an oil or a fat may be conditioned by the amount of hydrogen chemically united or bonded in its molecules. Hence, both through the naturally occurring solidity of fats and oils, and through the artificial hardness acquired by hydrogenation, the degree of hardness desired for the fat content of my product may be secured. By the term "hardness" as applied to my product and as used in this specification I mean, in common language, the firmness of structure or body commonly associated by the public with butter as eaten. By the term "homogenization" I mean, in common language, the partial destruction of the fat globule by pressure and mechanical manipulation, and the resulting more intimate mixture of the fatty content with the non-fatty content. This result is efficiently secured by use of apparatus now widely known and used for this particular purpose, but it may be also secured in a satisfactory manner by the process of emulsification so called, in which a machine known as an emulser is employed to reduce a fat-containing mixture to a relatively more homogeneous structure. Hence the term "homogenization" or words of similar meaning includes any manner of treatment as the result of which the fat globules are subdivided. But the term "homogeneous" or "homogeneously" is not limited to that quality of mixing or combination which results from the use of a homogenizing apparatus or from emulsification. The quality of uniformity which results from a simple stirring or agitation is within the meaning of "homogeneous" as here used. It should be further understood that the terms hereinabove defined and equivalent terms, as here used, have no further limiting significance than as thus indicated by the qualities and results with respect to which they are herein employed.

The hydrogenation of oils and the homogenizing of fatty mixtures are processes well understood and commonly practiced in the art, wherefore it is deemed unnecessary to describe in this specification the details of any particular one of such processes or any particular apparatus used in carrying out such process. It is sufficient to say that I may use methods and apparatus for these purposes which are standard at the present time, or any others which may be now or hereafter available for use by those acquainted with the art.

The great advantage of the present invention is that it greatly decreases the loss by spoilage of margarine products and the cost of handling such products. Margarines as heretofore made with the use of fluid milk need refrigeration for their preservation, and even when chilled they deteriorate. Since the exclusion of water from the product made in accordance with this invention obviates the tendency to become spoiled, my product can be shipped or stored and canned for future use, or put up and sold in the same manner as butter, and otherwise handled with a minimum of expense and without loss by spoilage. My product contains flavoring properties of the unevaporated milk or milk product from which the milk powder ingredient is derived, and various qualities and blends of flavor may be made by judicious selection and mixing of powders derived from different sources, as skim milk, whole milk, buttermilk, cream, and so forth.

What I claim and desire to secure by Letters Patent is:

1. An edible fat product consisting of a predominating proportion of edible fat and the balance consisting substantially of a dry powdered milk product, the whole being homogeneously mixed and free from water.

2. A butter substitute consisting of a hard edible fat in itself free from water and a dry milk powder in homogeneous admixture therewith and in sufficient proportional content to give a flavor approximating that of butter to the composition.

3. A margarine composition free from water and consisting essentially of edible fat and dried milk powder homogeneously mixed together.

4. An edible fat product consisting substantially of from 80% to 95% of edible fat and the balance substantially of a dried milk powder.

5. An edible fat product consisting substantially of from 80% to 95% of edible fat and the balance substantially of a dried milk powder, in that stage of homogeneous mixture resulting from thoroughly stirring said ingredients when the fat is in melted condition.

6. An edible fat composition consisting essentially of hard edible fat and a dry milk product in that stage of mingling resulting from stirring and homogenization of the mixture while at a temperature above the melting point of the fat.

7. An edible fat product consisting of a predominating proportion of edible fat, and a dry powdered milk product in a condition of homogeneous mixture therewith and in a proportion approximately representing the same percentage of the product by weight which the dry non-fatty milk elements contained in butter represent in reference to the weight of such butter.

8. The method of producing an edible fat composition which consists in melting hard edible fat, mixing with such melted fat a quantity of dry milk product, and allowing the mixture to cool.

9. The method of producing an edible fat composition which consists in melting hard edible fat, and mixing with such melted fat a quantity of dry milk product, homogenizing the mixture, and allowing the mixture to cool.

10. The method of producing a butter substitute which consists in melting a given quantity of hard edible fat, adding to the melted fat an amount of dry powdered milk product sufficient to give a flavor approximating that of butter, stirring the mixture to effect a substantially homogeneous mingling of the said substances, passing the mixture while at a temperature above the melting point of the fat through a homogenizing apparatus, and allowing the mixture to cool.

In testimony whereof I have affixed my signature.

JOHN C. SHERMAN.